(12) United States Patent
Baba (10) Patent No.: US 8,819,692 B2
(45) Date of Patent: Aug. 26, 2014

(54) JOB EXECUTING SYSTEM, JOB EXECUTING DEVICE AND COMPUTER-READABLE MEDIUM

(75) Inventor: Hideki Baba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 555 days.

(21) Appl. No.: 13/153,862

(22) Filed: Jun. 6, 2011

(65) Prior Publication Data

US 2012/0084786 A1    Apr. 5, 2012

(30) Foreign Application Priority Data

Oct. 4, 2010  (JP) .................................. 2010-225043

(51) Int. Cl.
   *G06F 9/46*    (2006.01)
(52) U.S. Cl.
   USPC .......... 718/104; 718/105; 358/1.13; 358/1.15
(58) Field of Classification Search
   None
   See application file for complete search history.

(56) References Cited

U.S. PATENT DOCUMENTS

| | | | | |
|---|---|---|---|---|
| 5,978,560 | A * | 11/1999 | Tan et al. ...................... | 358/1.15 |
| 8,270,012 | B2 * | 9/2012 | Martin et al. ................. | 358/1.15 |
| 8,306,535 | B2 * | 11/2012 | Masuda et al. .............. | 455/435.2 |
| 8,505,011 | B2 * | 8/2013 | Isaka .............................. | 718/100 |
| 2002/0083121 | A1 * | 6/2002 | Chang et al. .................... | 709/201 |
| 2003/0090694 | A1 * | 5/2003 | Kennedy et al. .............. | 358/1.13 |
| 2003/0184799 | A1 * | 10/2003 | Ferlitsch ....................... | 358/1.15 |
| 2004/0136030 | A1 * | 7/2004 | Gassho ......................... | 358/1.15 |
| 2004/0184080 | A1 * | 9/2004 | Gotoh et al. ................. | 358/1.15 |
| 2005/0088686 | A1 | 4/2005 | Tanimoto | |
| 2005/0289215 | A1 | 12/2005 | Namikata et al. | |
| 2006/0050294 | A1 * | 3/2006 | Smith et al. ................... | 358/1.15 |
| 2006/0244991 | A1 * | 11/2006 | Tenger et al. ................. | 358/1.15 |
| 2007/0250835 | A1 * | 10/2007 | Kobayashi et al. ............ | 718/102 |
| 2009/0165012 | A1 * | 6/2009 | Corona .......................... | 718/105 |
| 2009/0273808 | A1 * | 11/2009 | Kohli et al. ................... | 358/1.15 |
| 2009/0284779 | A1 | 11/2009 | Isshiki | |
| 2010/0007910 | A1 * | 1/2010 | Martin et al. ................. | 358/1.15 |
| 2010/0103453 | A1 * | 4/2010 | Tsutsumi ...................... | 358/1.15 |
| 2011/0222104 | A1 * | 9/2011 | Mohammad et al. ......... | 358/1.15 |

FOREIGN PATENT DOCUMENTS

| | | | |
|---|---|---|---|
| JP | 2003-281007 | A | 10/2003 |
| JP | 2005-117592 | A | 4/2005 |
| JP | 2005-352699 | A | 12/2005 |
| JP | 2007-306138 | A | 11/2007 |
| JP | 2009-054029 | A | 3/2009 |
| JP | 2009-278467 | A | 11/2009 |

OTHER PUBLICATIONS

Japanese Office Action dated Apr. 8, 2014, from the Japanese Patent Office in counterpart Japanese Application No. 2010-225043.

* cited by examiner

*Primary Examiner* — Emerson Puente
*Assistant Examiner* — Hiren Patel
(74) *Attorney, Agent, or Firm* — Sughrue Mion, PLLC (57) ABSTRACT

An image forming device includes a monitoring service performing unit and a service process performing instructing unit. The monitoring service performing unit acquires operation state information including index data that represents a service processing function mounted in the corresponding server and an operation state of the corresponding server from each server by starting a monitoring service when an accepted job is performed. The service process performing instructing unit instructs a low-load server to start a corresponding service processing function when the load on a server in which the service processing function used for executing the job is mounted is determined to be high. The server acquires the corresponding service processing function from the server in which the corresponding service processing function is mounted when being instructed to start an operation and thereafter performs the corresponding service process in accordance with the performance instruction transmitted from the image forming device.

4 Claims, 8 Drawing Sheets

JOB EXECUTING SYSTEM, JOB EXECUTING DEVICE AND COMPUTER-READABLE MEDIUM

CROSS-REFERENCE TO RELATED APPLICATION

This application is based on and claims priority under 35 USC119 from Japanese Patent Application No. 2010-225043 filed on Oct. 4, 2010.

BACKGROUND

Technical Field

The present invention relates to a job executing system, a job executing device and a computer-readable medium.

SUMMARY

[1] According to an aspect of the invention, a job executing system includes a job executing device and a plurality of service providing devices. The job executing device executes a requested job. The plurality of service providing devices provides a service processing function for executing the job. The job executing device includes a job accepting unit, an acquisition unit, a selection unit, and an instruction information transmitting unit. The job accepting unit accepts a request of a job execution. When the accepted job is executed, the acquisition unit acquires operation state information from each of the service providing devices. The operation state information includes index data which represents service processing functions mounted in the corresponding service providing device and an operation state of the corresponding service providing device. In a case where a load of one service providing device in which the service processing function used for executing the job is mounted exceeds a criterion for high-load determination, the selection unit selects another service providing device which satisfies a criterion for low-load determination by referring to the acquired operation state information. The instruction information transmitting unit transmits performance instruction information to the service providing device selected by the selection unit. The performance instruction information is used for instructing the selected service providing device to perform the corresponding service process. Each of the service providing devices includes a service process performing unit. The service process performing unit sets an environment in which the corresponding service process is performed and performs the corresponding service process in a case where the performance instruction information is transmitted from the instruction information transmitting unit.

BRIEF DESCRIPTION OF THE DRAWINGS

Exemplary embodiments of the invention will be described in detail based on the following figures, wherein.

DETAILED DESCRIPTION

Hereinafter, a preferred embodiment of the present invention will be described with reference to the drawings.

Figure 1:
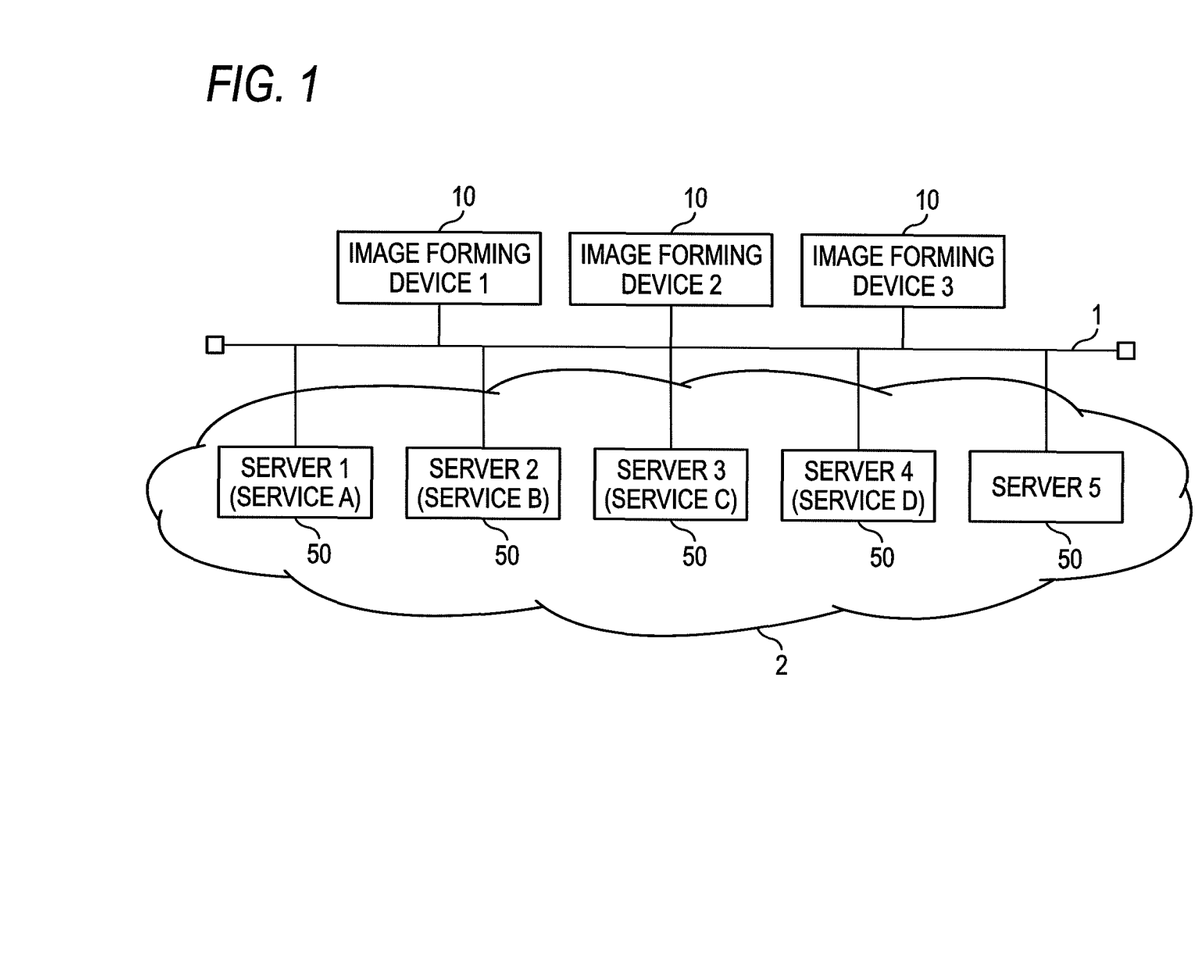
FIG. 1 is an overall configuration diagram illustrating an executing system according to an embodiment of the present invention.

FIG. 1 is an overall configuration diagram illustrating a job executing system according to an embodiment of the present invention. In FIG. 1, a configuration is illustrated in which three image forming devices 10 and a cloud 2 are connected to a network 1. The image forming device 10 according to this embodiment corresponds to a job executing device of the present invention, is a device having multiple functions such as a scanner function and a printing function, and executes a job requested from a user, or a part thereof. In a case where the image forming device 10 independently performs a service process, it may correspond to a service providing device according to the present invention. The cloud 2 is an abbreviated expression for cloud computing and includes a plurality of servers 50. Each server 50 corresponds to a service providing device of the present invention, and one or a plurality of service processing functions is built therein. A job that is handled by this embodiment is executed by one service process or a combination of a plurality of service processes such as text/picture separation, OCR, or translation. The server 50 performs one or a plurality of service processes in accordance with an instruction from the image forming device 10 from which a job is received. In FIG. 1, although three image forming devices 10 and five servers 50 are shown, the numbers of the devices and servers are not limited thereto.

Figure 2:
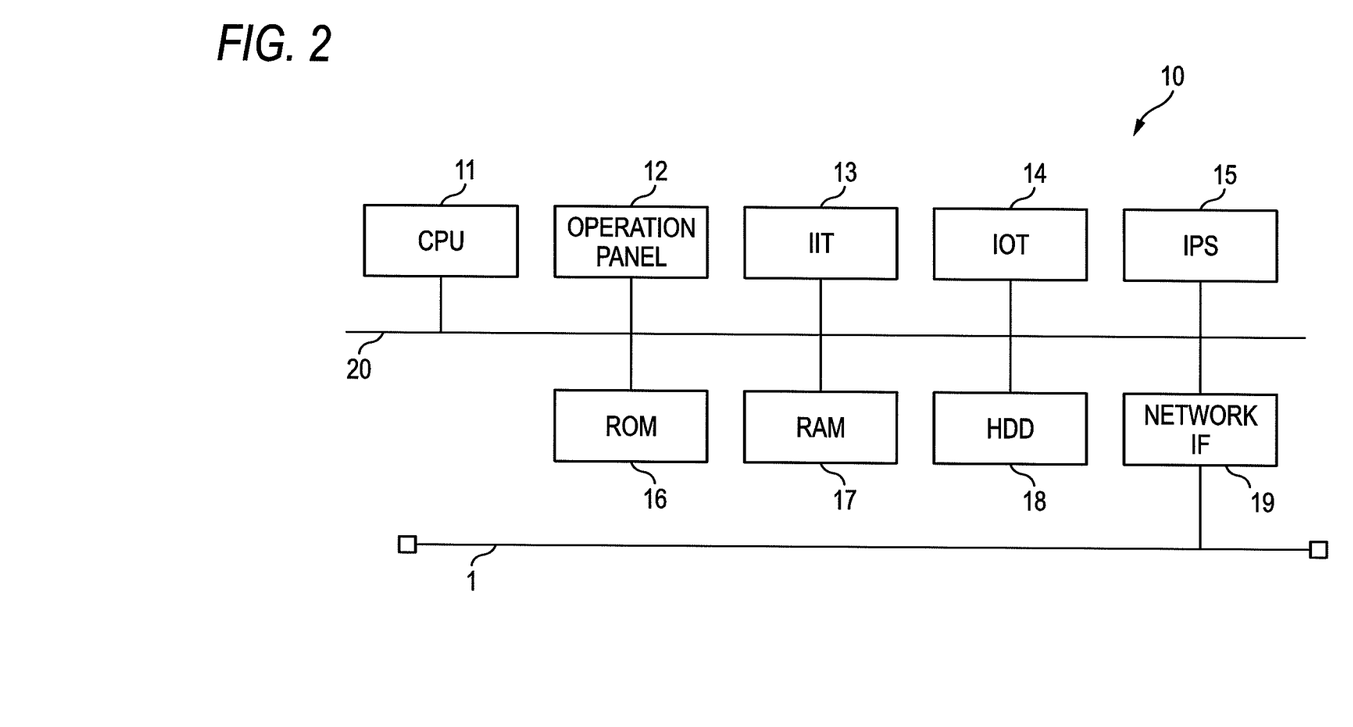
FIG. 2 is a diagram illustrating an example of a hardware configuration of an image forming device according to this embodiment.

FIG. 2 is a view showing an example of a hardware configuration of the image forming apparatus 10 according to this embodiment. The image forming apparatus 10 is an apparatus equipped with various functions as described above and incorporating a computer. Referring to FIG. 2, a CPU 11 controls the operations of various devices mounted on this apparatus, such as an IIT (image input terminal) 13, an IOT (image output terminal) 14, according to programs stored in a ROM 16. The IIT 13 is an image input device that reads a manuscript set by the user and stores obtained data as electronic data in an HDD (hard disk drive) 18 or the like. The IIT 13 may be accomplished by a scanner, for example. The IOT 14, serving as an image output device, prints images on output paper according to instructions from control programs executed by the CPU 11. The IOT 14 may be accomplished by a printer, for example. An address data bus 20 is connected to various devices that are controlled by the CPU 11 to perform data communication. The operation panel 12 receives instructions from the user and indicates information. In this embodiment, a job is generated by input from the operation panel 12. An IPS (image processing system) 15, serving as an image processing apparatus, executes the processing of images contained in a received job. The ROM (read-only memory) 16 stores various programs regarding the control of this apparatus, encrypted electronic data and the transmission/reception of the electronic data. Various components described later carry out their predetermined functions when the various programs are executed. A RAM (random access memory) 17 is used as a work memory when programs are executed or as a communication buffer when electronic data is transmitted/received. In this embodiment, the RAM 17 may also be used as a job queue. The HDD 18 stores electronic documents or the like read by the IIT 13 and software realizing a service processing function or the like. A network interface (IF) 19 is connected to the network 1 and used to communicate with the server 50. While the image forming device 1 to 3 as shown in FIG. 1 are different from each other in terms of their capabilities and their mounted function to perform their service processes, their hardware configurations are shown in FIG. 2

Figure 3:
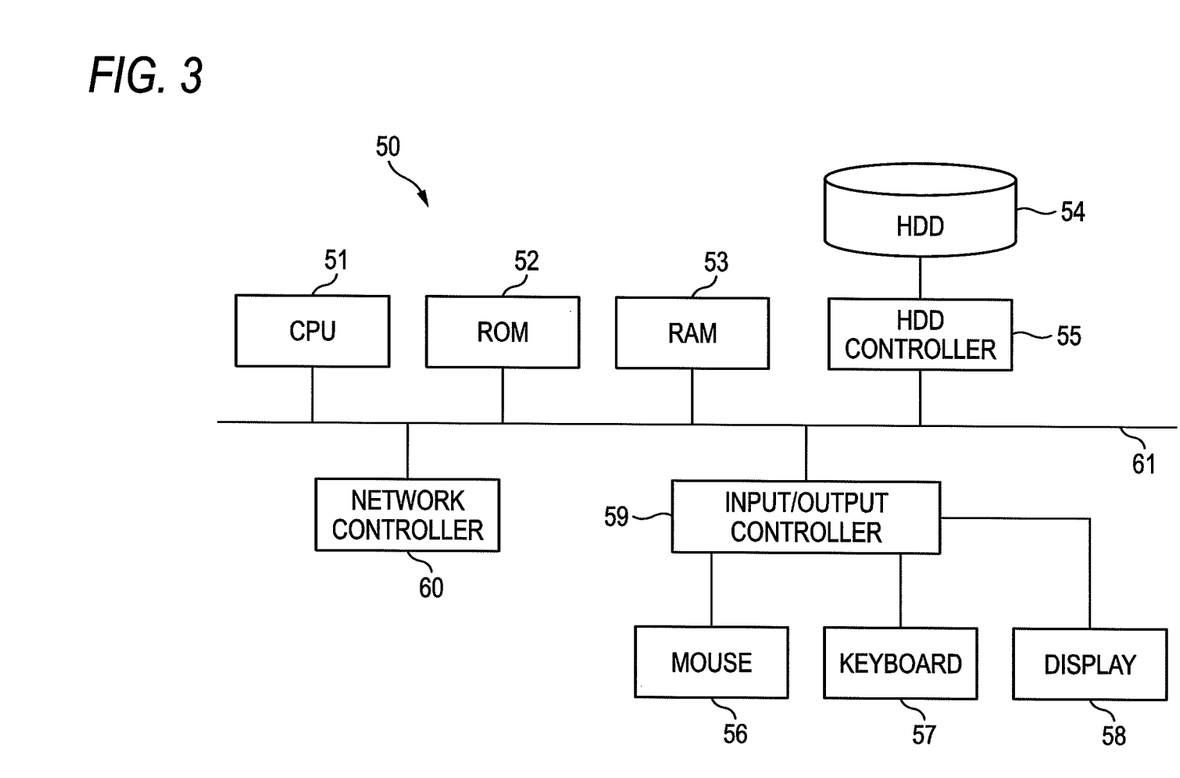
FIG. 3 is a configuration diagram of the hardware of a server computer according to this embodiment.

FIG. 3 is a configuration diagram of the hardware of a server computer that configures a server 50 according to this embodiment. The server 50 according to this embodiment can be implemented by a previously existing general-purpose hardware configuration. In other words, the computer, as illustrated in FIG. 3, is configured by connecting a CPU 51, a ROM 52, a RAM 53, an HDD controller 55 that is connected to a hard disk drive (HDD) 54 in which software realizing a service processing function or the like is stored, a mouse 56 and a keyboard 57 disposed as input means, an input/output controller 59 that is connected to a display 58 disposed as a display device, and a network controller 60 disposed as a communication unit to an internal bus 61. Although the servers 1 to 5 illustrated in FIG. 1 may have differences in their performance or built-in service processing functions, the hardware configurations are the same as that illustrated in FIG. 3.

Figure 4:
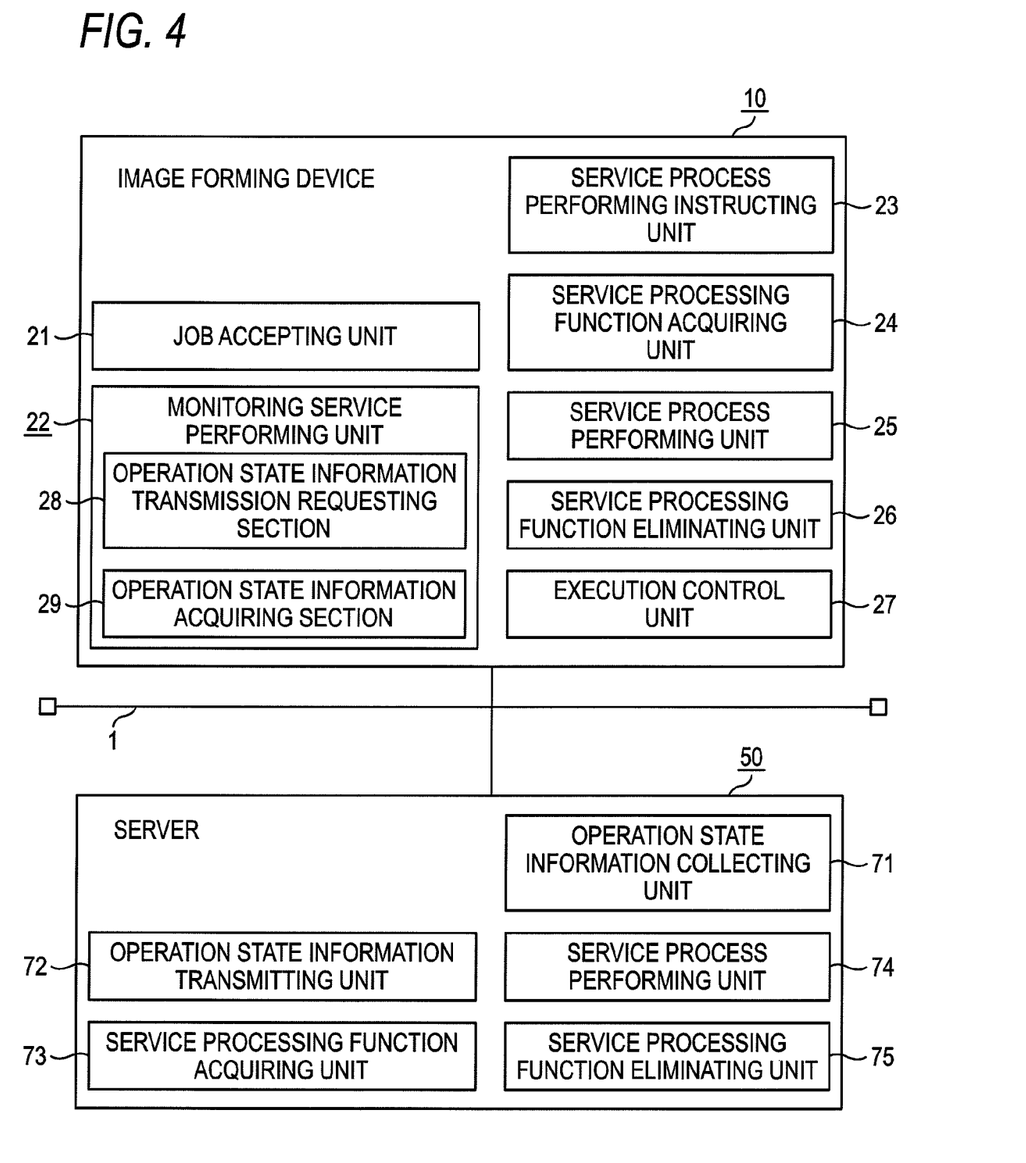
FIG. 4 is a block configuration diagram of a job executing system according to this embodiment.

FIG. 4 is a block configuration diagram of a job executing system according to this embodiment. Since the image forming devices 10 and the servers 50 shown in FIG. 1 have respectively the same configurations, only one of the image forming devices 10 and one of the servers 50 are illustrated in FIG. 4. In FIG. 4, the image forming device 10 includes a job accepting unit 21, a monitoring service performing unit 22, a service process performing instructing unit 23, a service processing function acquiring unit 24, a service process performing unit 25, a service processing function eliminating unit 26, and an execution control unit 27. The job accepting unit 21 corresponds to job accepting means of the present invention and accepts a job execution request. The job that is handled in this embodiment is executed by using one or a plurality of service processing functions. The monitoring service performing unit 22 corresponds to an acquisition means of the present invention, and the monitoring service is started when the job is executed, thereby performing a monitoring service. The monitoring service performing unit 22 includes an operation state information transmission requesting section 28 that requests that each server 50 transmit operation state information and an operation state information acquiring section 29 that acquires the operation state information that is transmitted from each server 50 in response to the transmission request. The service process performing instructing unit 23 corresponds to an instruction information transmitting means of the present invention and transmits instruction information used for instructing the server 50 to perform a service process, thereby instructing the server to perform the corresponding service process. In the instruction information that is transmitted, information specifying a server 50 in which the corresponding service processing function is built-in may be included for transmission. The service processing function acquiring unit 24, in a case where a service processing function is not built into the image forming device 10 to which it belongs, sets an environment in which the corresponding service process can be performed. The environment settings described here, for example, are to allow the image forming device 10 to perform corresponding service process by downloading software that implements the service processing function from a server 50 in which the service processing function is built-in or the like. The service process performing unit 25 performs a service process to be performed by the image forming device to which it belongs. The service processing function eliminating unit 26, after performing a service process, eliminates software that implements the service processing function, thereby returning the software environment of the image forming device 10 to its original state. The execution control unit 27 controls the execution of a job in the image forming device 10 by determining the image forming device 10 or the server 50 that performs each service process in cooperation with the other constituent elements 21 to 26. Particularly, the execution control unit 27 according to this embodiment corresponds to a selection means of the present invention, and a service processing function that is used for executing a job is built therein. Accordingly, in a case where the load on the server 50 that is originally desired for use exceeds a determination criterion used for high-load determination, and use of the server needs to be avoided, the execution control unit 27 selects another server 50 that satisfies the low-load determination criterion used for replacing the load on the server 50.

The components 21 to 27 of the image forming apparatus 10 are accomplished by the cooperation between the computer formed in the image forming apparatus 10 and programs operating on the CPU 11 mounted on the computer.

The server 50 includes an operation state information collecting unit 71, an operation state information transmitting unit 72, a service processing function acquiring unit 73, a service process performing unit 74, and a service processing function eliminating unit 75. When a request is transmitted from the operation state information transmission requesting section 28, the operation state information collecting unit 71 collects operation state information that includes index data representing the service processing function that is built into the server to which it belongs and the operation state of the above-described server and generates operation state information in accordance with the request. The operation state information transmitting unit 72 transmits the operation state information that is collected and generated by the operation state information collecting unit 71 to the operation state information acquiring section 29. The service processing function acquiring unit 73, the service process performing unit 74, and the service processing function eliminating unit 75 correspond to a service process performing means of the present invention, and the process functions thereof may be the same as those of the service processing function acquiring unit 24, the service process performing unit 25, and the service processing function eliminating unit 26 of the image forming device 10. In other words, in a case where a service processing function to be performed in the server to which it belongs is not built-in, the service processing function acquiring unit 73 sets environments in which the corresponding service process can be performed. The service process performing unit 74 performs a service process. After the service process is performed, the service processing function eliminating unit 75 eliminates the software that implements the service processing function, thereby returning the software environment of the server to which it belongs to its original state.

The constituent elements 71 to 75 of the server 50 are implemented by the cooperative operations of the computer configuring the server 50 and the programs executed by the CPU 51 that are built into the computer.

Furthermore, programs to be used in this embodiment can be provided through the communication means as a matter of course and can also be provided as being stored in computer-readable recording media, such as CD-ROMs and DVD-ROMs. The programs provided by the communication means or recording media are installed in the computer, and the installed programs are executed sequentially by the CPU of the computer to execute various kinds of processing.

Figure 5A:
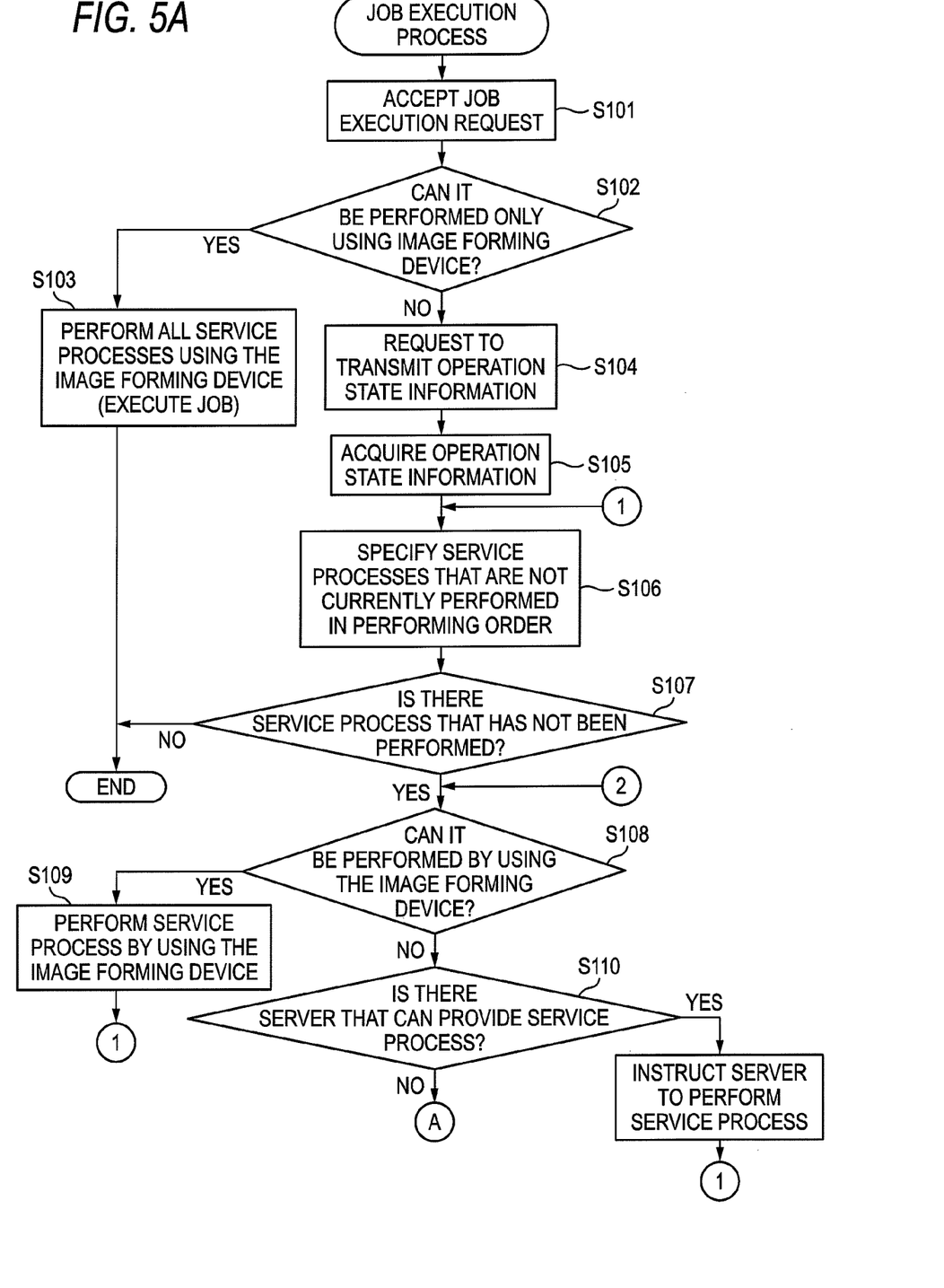
FIG. 5A is a flowchart illustrating a job execution process according to this embodiment.
Figure 5B:
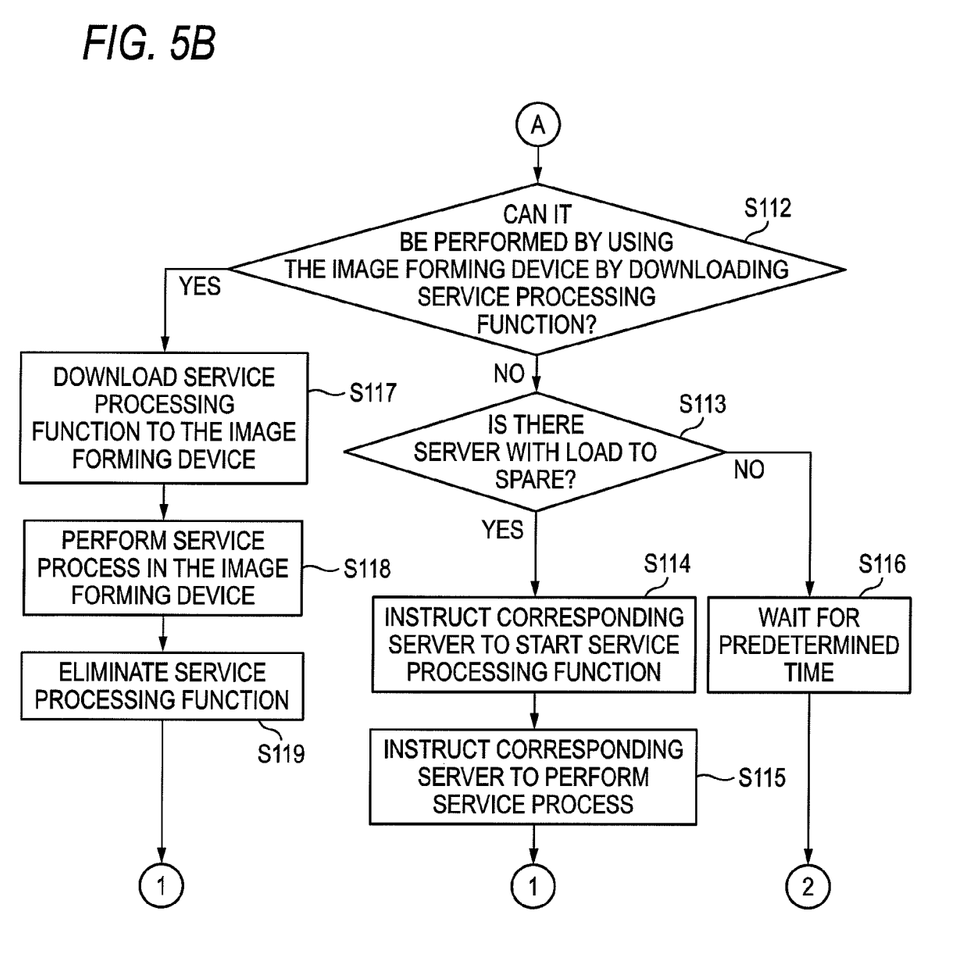
FIG. 5B is a flowchart continued from FIG. 5A.

Next, a job executing process, in which the image forming device 10 executes a job in accordance with a job execution request, according to this embodiment will be described with reference to the flowchart illustrated in FIGS. 5A and 5B.

The job accepting unit 21 of the image forming device 10 accepts a job execution request from a user (Step 101). The job execution request may be performed by a user designating an image forming device 10 in which a job is executed using a personal computer, which is not shown in the figure, or the like and transmitting the job execution request together with electronic data as a processing target to the image forming device 10 through a network. Alternatively, the user may set desired parameters or the like by operating the operation panel 12 and issue a job execution request, for example, by pressing a start button. At this time, the electronic data that may be acquired by scanning a document may be read out from an IIT 13.

When the accepted job is started to be executed, in a case where all the service processing functions necessary for this job are built into the image forming device 10 and the execution control unit 27 determines that the job can be executed by using the image forming device 10 to which it belongs (Step 102; Yes), the service process performing unit 25 executes the job in accordance with an instruction from the execution control unit 27 (Step 103). In other words, in this case, a request for performing the service process is not made to the server 50, in other words, the job is not distributed and is executed by the image forming device 10 alone.

On the other hand, in a case where the execution control unit 27 determines that the job cannot be executed only by the image forming device to which it belongs (Step 102; No), the execution control unit 27 instructs the monitoring service performing unit 22 to perform a monitoring service. The monitoring service performing unit 22 starts a monitoring service in accordance with the instruction from the execution control unit 27 and, first, requests that each server 50 transmit the operation state information (Step 104).

When the request for transmitting the operation state information, which is transmitted from the image forming device 10, is received, the operation state information collecting unit 71 of each server 50 collects information relating to the index data that represents the service processing function built into the server to which it belongs and the operation state of the above-described server and generates operation state information including the information relating to the index data. The index data representing the operation state may be index data that is used to represent the load on the server 50, such as the CPU usage rate, the memory usage rate, and the number of processes that are currently performed. In addition, regarding the collection period of the operation state, the operation state may be an operation state during a predetermined period or an operation state at a time point in the server 50. When the operation state information is acquired as above, the operation state information transmitting unit 72 transmits the operation state information of the server to which it belongs to the image forming device 10 as a request source.

When the operation state information acquiring unit 30 of the image forming device 10 acquires the operation state information that is replied from each server 50 (Step 105), the operation state information acquiring unit 30 determines each service process that is necessary for executing the job (Step 107) to be performed by a specific server 50 or the image forming device to which it belongs and performs the service process in the performing sequence of the service processes in the job.

First, a service process that is not performed yet is specified out of the service processes that are necessary for executing the job (Step 106). In a case where the service processing function that implements a specific service process is built into the above-described image forming device 10 (Step 108; Yes), the execution control unit 27 performs the corresponding service process in the above-described image forming device 10 (Step 109). Then, the process proceeds to the next service processing function (Step 106), and, in a case where the service processing function as a processing target is not built into the above-described image forming device 10 (Step 108; No), the execution control unit 27 performs the following process for selecting a server 50 that performs the service process by referring to the operation state information acquired in Step 105.

First, the execution control unit 27 selects a server 50 in which the service processing function as the processing target is built-in by referring to the acquired operation state information. Then, the current load state of the server 50 is acquired from the operation state information of the selected server 50. In this embodiment, a determination criterion used for high-load determination is set in advance, and, in a case where the load in the server 50 exceeds this determination criterion, the corresponding server 50 is determined to be in a high load state. As the determination criterion used for high-load determination, a determination criterion regarded as a high load state is set, for example, in a case where the CPU usage rate or the memory usage rate is equal to or higher than a predetermined threshold value, a case where there are two or more service processing functions that are currently operated, or the like.

In a case where the selected server 50 is not in the high load state, and a state is determined in which the service process using the corresponding service processing function can be provided (Step 110; Yes), the execution control unit 27 instructs the service process performing instructing unit 23 to instruct the selected server 50 to perform the corresponding service process. The service process performing instructing unit 23 transmits instruction information used for instructing the performing of the service process to the server 50 in accordance with the instruction from the execution control unit 27 (Step 111). The service process performing unit 74 of the server 50 starts the corresponding service processing function so as to perform the service process in accordance with the instruction from the image forming device 10. Then, after performing the process, the service process performing unit 74 returns a result of the performance to the image forming device 10.

On the other hand, in a case where the selected server 50 is in the high load state, and a state is determined in which the service process using the service processing function cannot be provided (Step 110; No), the execution control unit 27, next, downloads the corresponding service processing function into the above-described image forming device 10 and determines whether or not the service process using the service processing function can be performed. To be more specific, as determined in Step 110, the load state of the above-described image forming device 10 is checked, and it is determined whether or not the service process can be performed.

Here, in a case where a state is determined in which the corresponding service process cannot be performed due to a high load on the above-described image forming device 10 (Step 112; No), the execution control unit 27 selects a low-load server 50. In this embodiment, the determination criterion that is used for low-load determination is set in advance, and if the load on a server 50 is below this determination criterion, the corresponding server 50 is determined to be in a low load state. As the determination criterion that is used for low-load determination, for example, the determination criterion is set such that a case where the CPU usage rate or the memory usage rate is equal to or less than a predetermined threshold value, a case where there is no service processing function currently operating, and the like, is considered to be a low load state is set.

In a case where it is determined that there is a server (hereinafter, also referred to as a "low-load server") 50 having load to spare due to having a low load (Step 113; Yes), the execution control unit 27 instructs the low-load server 50 to instruct to perform the corresponding service process. The service process performing instructing unit 23 transmits start-up instruction information of the service processing function to the low-load server 50 in accordance with the instruction from the execution control unit 27 (Step 114). Since the service process performing instructing unit 23 can specify a server 50 in which the corresponding service processing function is built-in by referring to the operation state information, the service process performing instructing unit 23 acquires information used for specifying the server 50 such as the ID or the name of the server or the IP address thereof and allows the information to be included in the start-up instruction information. Basically, information used for specifying the server (hereinafter, also referred to as a "high-load server") 50 determined not to be able to perform the corresponding service process due to a high load is included in the start-up instruction information. However, information used for specifying a sever 50 other than the high-load server in which the corresponding service processing function is built-in may be included in the start-up instruction information.

The service processing function acquiring unit 73 of the server 50 that has received the start-up instruction information sets the environment for performing the corresponding service process in accordance with the instruction from the image forming device 10 by downloading software having the corresponding service processing function from the server 50 that can be specified based on the information included in the start-up instruction information or the like. In this embodiment, although information that is used for specifying the server 50 as a download destination is included in the start-up instruction information, the server 50 that has received a startup instruction may search for a server 50 as a download destination by inquiring to other servers 50.

After a predetermined time elapses, or the completion of the environment settings is recognized by receiving a notification from the server 50 or the like, the service process performing instructing unit 23 transmits performance instruction information used for instructing the server 50 to perform the service process to the server 50 (Step 115). The service process performing unit 74 of the server 50 performs the service process using the corresponding service processing function in accordance with the instruction from this image forming device 10. Then, after performing the process, the service process performing unit 74 returns the result of the performance to the image forming device 10. After checking the completion of the performance of the service process, the service processing function eliminating unit 75 eliminates the software that has been acquired through downloading, thereby returning the software environment of server 50 to its original state.

According to this embodiment, as above, in a case where the server 50, in which the corresponding service processing function is built-in, has a high load, a server 50 having a low load in which the corresponding service processing function is not built-in acquires the corresponding software so as to set the environment in which the service process can be performed and performs the service process instead of the high-load server 50.

In this embodiment, after the start-up instruction information is transmitted (Step 114), the performance instruction information is separately transmitted (Step 115). However, the start-up instruction information may be included in the performance instruction information. In other words, it may be configured so that the low-load server 50 sets the environment for performing the service process in response to the reception of the performance instruction information and, after the environment settings are completed, starts to perform the corresponding service process without being instructed from the image forming device 10.

In addition, in a case where there is no server 50 having a load to spare (Step 113; No), the execution control unit 27 may wait for a predetermined time and return the process back to Step 108. Alternatively, the execution control unit 27 may wait until a server 50 having a load to spare appears and return the process back to Step 113.

In addition, in a case where the load on the above-described image forming device 10 is not high, and it is determined that the corresponding service process can be performed thereby (Step 112; Yes), the same processes as the processes of the low-load server 50 in Steps 114 and 115 described above are performed for the above-described image forming device 10. In other words, the service processing function acquiring unit 24 sets the environment for performing the corresponding service process by downloading the software of the service processing function from the server 50 that can be specified based on the information included in the start-up instruction information (Step 117). Thereafter, the service process performing unit 25 performs the service process using the corresponding service processing function (Step 118). Then, after stopping of the performing of the service process is checked, the service processing function eliminating unit 26 eliminates the software acquired though the download so as to return the software environment of the image forming device 10 to its original state (Step 119).

Next, a job execution process according to this embodiment will be described based on a specific example.

FIGS. 6A to 6D are diagrams illustrating the states of the image forming device 10 and the server 50 while performing the job execution process. The image forming devices 1 to 3 illustrated in FIGS. 6A to 6D correspond to the image forming device 10 illustrated in FIGS. 1 and 4, and the servers 1 to 5 correspond to the server 50 illustrated in FIGS. 1 and 4.

Figure 6A:
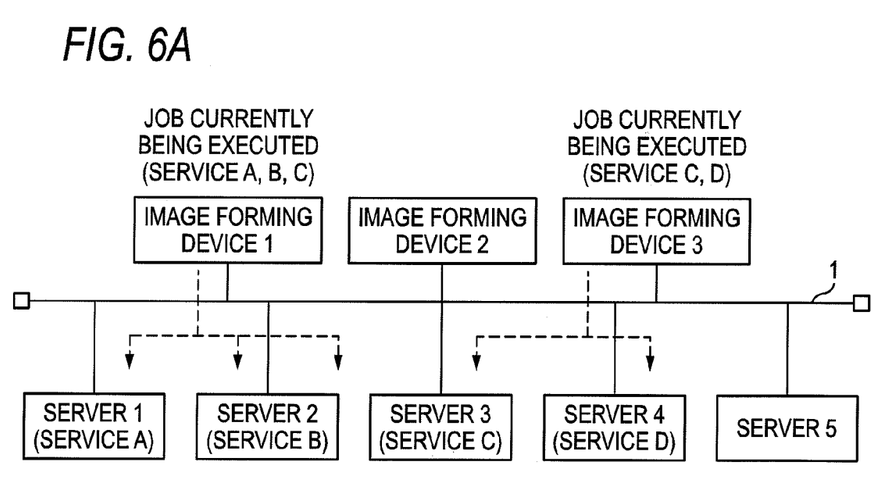
FIG. 6A is a conceptual diagram illustrating the state of a job executing system during a job execution process according to this embodiment.

In FIG. 6A, in the servers 1 to 4 out of the servers 1 to 5, service processing functions A to D are built-in in a usable state. In addition, the image forming device 1 and the image forming device 3 currently perform jobs. In addition, the job executed by the image forming device 1 needs to use service processing functions A, B, and C and accordingly performs distributed processing using the servers 1 to 3 in which the corresponding service processing functions A to C are built-in. The servers 1 to 3 perform the corresponding service processes in a sequential or parallel manner in accordance with an instruction from the image forming device 1. In addition, the job executed by the image forming device 3 needs to use the service processing functions C and D and accordingly, performs distributed processing using the server 3 and 4 in which the corresponding service processing functions C and D are built-in. The servers 3 and 4 perform the corresponding service processes in a sequential or parallel manner in accordance with an instruction from the image forming device 3. In addition, the server 3 that has received performance instructions from a plurality of the image forming devices 1 and 3 basically performs the service processes in the order of reception of the instructions.

Figure 6B:
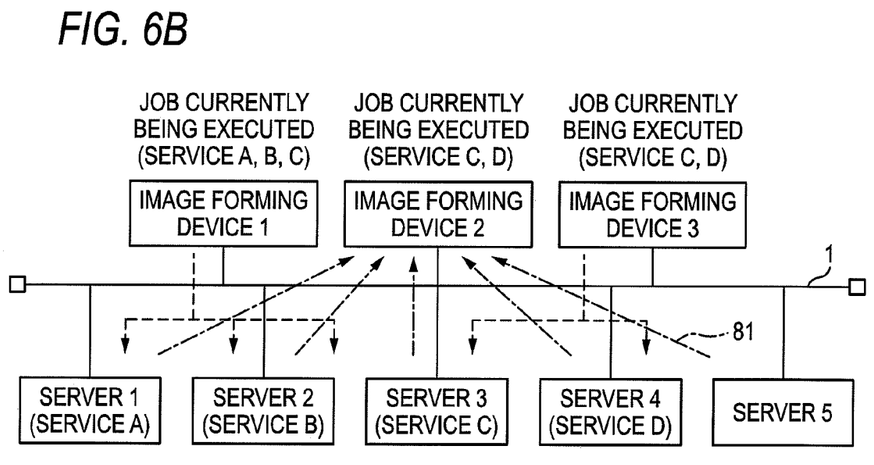
FIG. 6B is a conceptual diagram illustrating the state of a job executing system during a job execution process according to this embodiment.

In this state, when accepting a job execution request using the service processing functions C and D (Step 101), the image forming device 2 starts to perform the job. Here, in a case where the service processing functions C and D are built into the image forming device 2 (Step 102; Yes), the image forming device 2 performs the accepted job independently (Step 103). On the other hand, in a case where all the service processing functions C and D are not built into the image forming device 2 (Step 102; No), the image forming device 2 requests that the servers 1 to 5 transmit the operation state information (Step 104) so as to acquire the operation state information (Step 105). The state at a time when the operation state information is acquired is illustrated in FIG. 6B. In FIG. 6B, the appearance of acquiring the operation state information 81 is denoted by a dashed-dotted line.

Figure 6C:
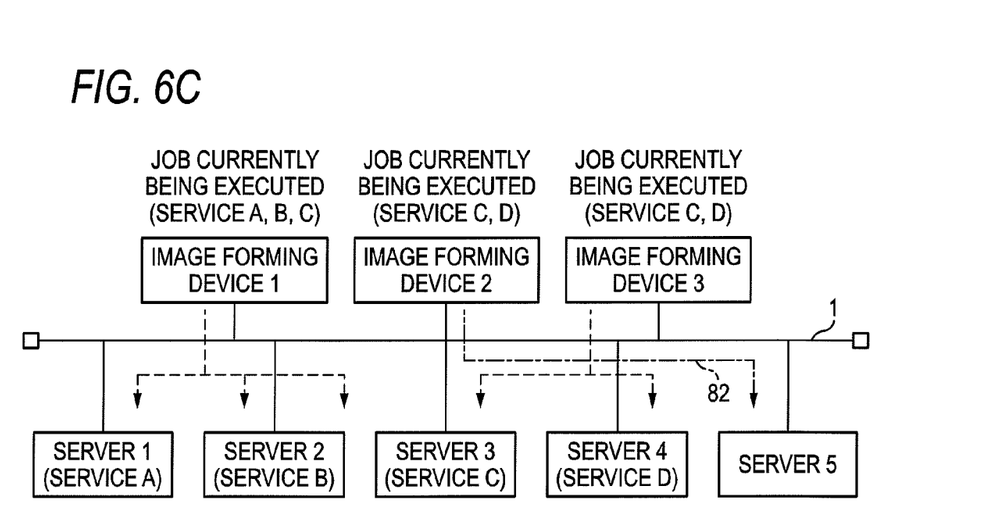
FIG. 6C is a conceptual diagram illustrating the state of a job executing system during a job execution process according to this embodiment.

First, the image forming device 2 determines the performing destination of the service processing function C (Steps 106 and 107). Accordingly, the load on the image forming device 2 is checked, and, in a case where it is determined that the service process can be performed by the image forming device 2 due to the service processing function C being built therein, a low load, or the like (Step 109; Yes), the corresponding service process is performed by the image forming device 2 (Step 109). On the other hand, in a case where a state is determined in which the corresponding service process cannot be performed by the image forming device 2 (Step 109; No), whether there is a server that can perform the service process is checked. In this example, by referring to the acquired operation state information of the servers 1 to 5, it can be recognized that the service processing function C is built into the server 3. Accordingly, in this example, the load state of the server 3 is checked. In this example, since the server 3 has received the service process performing requests from two image forming devices 1 and 3, the image forming device 2 determines that the load on the server 3 is high. In this case (Step 110; No), the image forming device 2 checks whether the service process can be performed thereby. Here, it is assumed that the image forming device 2 determines that the service process cannot be performed thereby. In the case (Step 112; No), the image forming device 2 checks whether there is a server having a low load by referring to the acquired operation state information of each of the servers 1 to 5. Here, in a case where the load on the server 5 is determined to be low due to no instruction for performing a service process (Step 113; Yes), the image forming device 2 transmits the start-up instruction information to the server 5 (Step 114). A state is illustrated in FIG. 6C in which this start-up instruction information is transmitted. In FIG. 6C, the appearance of transmitting the start-up instruction information 82 is denoted by a dashed-dotted line.

Figure 6D:
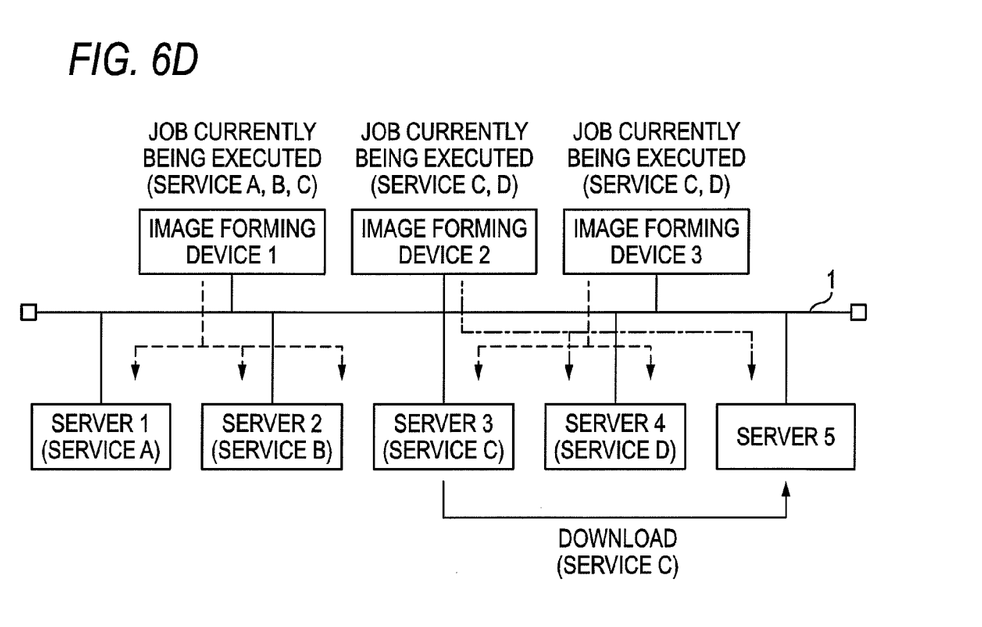
FIG. 6D is a conceptual diagram illustrating the state of a job executing system during a job execution process according to this embodiment.

The server 5 sets the environment in which the service process using the service processing function C can be performed by downloading the corresponding software from the server 3 in which the service processing function C is built into accordance with the start-up instruction information transmitted from the image forming device 2. A state is illustrated in FIG. 6D in which the software is downloaded from the server 3.

As above, after the environment settings are completed, the server 5 performs the corresponding service process in accordance with the performance instruction information (Step 115) transmitted from the image forming device 2. When the performing of the corresponding service process is completed, the server 5 transmits the result of the performance to the image forming device 2 and returns the software environment of the server 2 back to its original state by eliminating the software which has become unnecessary due to completion of the execution thereof from the server 2.

Returning back to Step 106, subsequently, the process for the service processing function D is started. In a case where the service processing function D is built into the image forming device 2, the corresponding service process is performed by the image forming device 2 (Step 108: Yes, Step 109). On the other hand, in a case where the service processing function D is not built into the image forming device 2 (Step 108; No), it can be recognized that the service processing function D is built into the server 4 by referring to the acquired operation state information of each of the servers 1 to 5, and accordingly, the load state of the server 4 is checked. In this example, since the server 4 is only requested to perform a service process from the image forming device 3, the image forming device 2 determines the load on the server 4 to not be high (Step 110; Yes) and instructs the server 4 to perform a service process using the service functioning process D (Step 111). In accordance with this instruction, the server 4 performs a corresponding service process. As above, a state is illustrated in FIG. 6D in which the image forming device 2 instructs the server 5 to perform a service process using the service processing function C and instructs the server 4 to perform a service process using the service processing function D, and the service processes are performed. As above, the job accepted by the image forming device 2 is processed in a distributed manner.

In this embodiment, the operation state information is acquired after starting to perform a job (Step 105), and accordingly, in order to allocate the service processes to any server 50 or the image forming device 2, the acquired operation state information is referred to. However, the process of acquiring the operation state information may be performed immediately before Step 108. In other words, when the server 50 is determined for performing each service process, the operation state information may be acquired. Alternatively, separately from the executing of the job, the operation state information may be acquired on a regular basis. Furthermore, in a case where the built-in service processing function is not frequently changed, the operation state information may not be acquired each time the execution of a job is started, and the correspondence relationship between the servers 50 and the service processing functions built into each server 50 may be set in the memory means of the image forming device 10 or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A job executing system comprising:
a job executing device, comprising a processor, that executes a requested job; and
a plurality of service providing devices that provides a service processing function used for executing the requested job,
wherein the job executing device includes:
a job accepting unit that accepts a job execution request;
an acquisition unit that, in response to a first determination that the service processing function used for executing the requested job corresponding to the job execution request is not available in the job execution device, acquires operation state information from each of the service providing devices, the operation state information including index data which represents service processing functions available in the corresponding service providing device and an operation state of the corresponding service providing device;
a selection unit that:
in response to the first determination and a second determination that the service processing function used for executing the requested job is available in at least one of the plurality of service providing devices, in a case where a load of one service providing device in which the service processing function used for executing the job is available exceeds a criterion for high-load determination, selects another service providing device which satisfies a criterion for low-load determination by referring to the acquired operation state information; and
in response to the first determination and a third determination that the service processing function used for executing the requested job is not available in the plurality of service providing devices, selects a service providing device to which software enabling the service processing function is to be downloaded; and
an instruction information transmitting unit that, in response to the first determination and the second determination, transmits performance instruction information to the service providing device selected by the selection unit, the performance instruction information used for instructing the selected service providing device to perform the corresponding service process,
wherein each of the service providing devices includes:
a service process performing unit that sets an environment in which the corresponding service process is performed and that performs the corresponding service process in a case where the performance instruction information is transmitted from the instruction information transmitting unit,
wherein the instruction information transmitting unit transmits start-up instruction information to the service providing device selected by the selection unit, the start-up instruction information including information used for specifying the one service providing device in which the corresponding service processing function is available, and
wherein the service process performing unit of the selected service providing device performs environment settings for performing the corresponding service process by downloading software from the one service providing device specified based on the information used for specifying the one service providing device which is included in the start-up instruction information.

2. The job executing system according to claim 1,
wherein the service process performing unit deletes the software after performing the corresponding service process.

3. A job executing device comprising:
a processor;
a job accepting unit that accepts a job execution request;
an acquisition unit that, in response to a first determination that a service processing function used for executing a job corresponding to the accepted job execution request is not available in the job execution device, acquires operation state information from each of service providing devices which provides service processing functions for executing the job, the operation state information including index data which represents service processing functions available in the corresponding service providing device and an operation state of the corresponding service providing device;
a selection unit that:
in response to the first determination and a second determination that the service processing function used for executing the job is available in at least one of the service providing devices, in a case where a load of one service providing device in which the service processing function used for executing the job is available exceeds a criterion for high-load determination, selects another service providing device which satisfies a criterion for low-load determination by referring to the acquired operation state information; and
in response to the first determination and a third determination that the service processing function used for executing the job is not available in the service providing devices, selects a service providing device to which software enabling the service processing function is to be downloaded; and
an instruction information transmitting unit that, in response to the first determination and the second determination, transmits performance instruction information to the service providing device selected by the selection unit, the performance instruction information used for instructing the selected service providing device to perform the corresponding service process,
wherein the instruction information transmitting unit transmits start-up instruction information to the service providing device selected by the selection unit, the start-up instruction information including information used for specifying the one service providing device in which the corresponding service processing function is available, and
wherein a service process performing unit of the selected service providing device performs environment settings for performing the corresponding service process by downloading software from the one service providing device specified based on the information used for specifying the one service providing device which is included in the start-up instruction information.

4. A non-transitory computer-readable medium storing a program that causes a computer to execute job execution, the job execution comprising:
accepting a job execution request;
acquiring, in response to a first determination that a service processing function used for executing a job corresponding to the accepted job execution request is not available in the job execution device, operation state information from each of service providing devices which provides service processing functions for executing the job when the accepted job is executed, the operation state information including index data which represents service processing functions available in the corresponding service providing device and an operation state of the corresponding service providing device;

selecting:
- in response to the first determination and a second determination that the service processing function used for executing the job is available in at least one of the service providing devices, another service providing device which satisfies a criterion for low-load determination by referring to the acquired operation state information in a case where a load of one service providing device in which the service processing function used for executing the job is available exceeds a criterion for high-load determination; and
- in response to the first determination and a third determination that the service processing function used for executing the job is not available in the service providing devices, a service providing device to which software enabling the service processing function is to be downloaded; and transmitting, in response to the first determination and the second determination, performance instruction information to the selected service providing device, the performance instruction information used for instructing the selected service providing device to perform the corresponding service process, wherein start-up instruction information is transmitted to the selected service providing device, the start-up instruction information including information used for specifying the one service providing device in which the corresponding service processing function is available, and wherein the selected service providing device performs environment settings for performing the corresponding service process by downloading software from the one service providing device specified based on the information used for specifying the one service providing device which is included in the start-up instruction information.

* * * * *